US007922251B2

(12) United States Patent
Hayakawa et al.

(10) Patent No.: US 7,922,251 B2
(45) Date of Patent: Apr. 12, 2011

(54) VEHICLE SEATS

(75) Inventors: Hiromasa Hayakawa, Toyoake (JP);
Shingo Suzushika, Toyota (JP);
Masaharu Nakamura, Anjo (JP); Ko Ishikawa, Toyota (JP)

(73) Assignees: Toyota Boshoku Kabushiki Kaisha, Aichi-Ken (JP); Aisin Seiki Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/666,443

(22) PCT Filed: Jun. 12, 2008

(86) PCT No.: PCT/JP2008/060752
§ 371 (c)(1),
(2), (4) Date: Mar. 4, 2010

(87) PCT Pub. No.: WO2009/004904
PCT Pub. Date: Jan. 8, 2009

(65) Prior Publication Data
US 2010/0176641 A1 Jul. 15, 2010

(30) Foreign Application Priority Data
Jun. 29, 2007 (JP) .................................. 2007-171843

(51) Int. Cl.
*B60N 2/02* (2006.01)
(52) U.S. Cl. ............ 297/378.1; 297/378.12; 297/378.14
(58) Field of Classification Search ............... 297/378.1, 297/378.12, 378.14
See application file for complete search history.

(56) References Cited

U.S. PATENT DOCUMENTS

| 6,106,062 | A  | * | 8/2000  | Ambrose et al. ............. 297/281 |
| 6,336,679 | B1 |   | 1/2002  | Smuk |
| 6,601,921 | B1 | * | 8/2003  | Collins .................... 297/378.12 |
| 7,434,883 | B2 | * | 10/2008 | Deptolla ....................... 297/341 |
| 7,434,885 | B2 | * | 10/2008 | Becker et al. ............ 297/378.12 |
| 7,690,728 | B2 | * | 4/2010  | Miyauchi et al. ........ 297/378.12 |
| 2004/0021355 | A1 |   | 2/2004  | Ohba |

(Continued)

FOREIGN PATENT DOCUMENTS

JP 2002-501852 1/2002

(Continued)

OTHER PUBLICATIONS

English language Abstract of JP 2003-341392, Dec. 3, 2003.

(Continued)

*Primary Examiner* — Sarah B McPartlin
(74) *Attorney, Agent, or Firm* — Greenblum & Bernstein, P.L.C.

(57) ABSTRACT

According to this invention, there are provided a stopper stopping forward pivoting of a seat back at the position of a forwardly tilted state, a stopper operation mechanism, a reclining mechanism switching the seat back between a free state in which it can be pivoted with respect to a seat cushion and a lock state in which it cannot be pivoted with respect thereto, a reclining lever, and a connection lever. Through operation of operation levers the seat back is placed in the free state via the stopper operation mechanism, the connection lever, and the reclining lever, and the stopper is moved via the stopper operation mechanism. And, between the stopper operation mechanism and the reclining lever is provided a retention mechanism that retains the stopper at a position to which the stopper is moved.

3 Claims, 8 Drawing Sheets

U.S. PATENT DOCUMENTS

2009/0051202 A1    2/2009  Ozeki et al.
2009/0167046 A1    7/2009  Yamagishi
2009/0167068 A1    7/2009  Yamagishi

FOREIGN PATENT DOCUMENTS

| | | |
|---|---|---|
| JP | 2003-182416 | 7/2003 |
| JP | 2003-341392 | 12/2003 |
| JP | 2004-58928 | 2/2004 |
| WO | 03/004307 | 1/2003 |
| WO | WO 2006/132127 | 12/2006 |

OTHER PUBLICATIONS

English language Abstract of JP 2003-182416, Jul. 3, 2003.
English language Abstract of JP 2004-58928, Feb. 26, 2004.
English language Abstract of JP 2002-501852, Jan. 22, 2002.
English language Abstract of WO 2006/132127, Dec. 14, 2006.
U.S. Appl. No. 12/666,473 to Hiromasa Hayakawa et al., filed Dec. 23, 2009.

* cited by examiner

VEHICLE SEATS

TECHNICAL FIELD

The present invention relates to a vehicle seat. In particular, the present invention relates to a vehicle seat that is switched between a rearwardly tilted state in which a seat back pivotably mounted to a seat cushion is rearwardly tilted, a forwardly tilted state in which the seat back is forwardly tilted, and a greatly tilted state in which the seat back is tilted further forwards beyond the forwardly tilted state.

BACKGROUND ART

Conventionally, a seat back of a known vehicle seat can be switched between a rearwardly tilted state, a forwardly tilted state, and a greatly tilted state (See Japanese Laid-Open Patent Publication No. 2002-501852). In a seat of this type, by placing it in the forwardly tilted state, it becomes easier for the occupant to get on a seat in the rear row (a walk-in state), and, by placing it in the greatly tilted state, the luggage space is enlarged (a down state).

In the conventional vehicle seat, when placing the seat back in the forwardly tilted state, a forward tilting operation lever provided on a side surface of the seat cushion is operated. As a result, as shown in FIG. 9, a stopper operation lever 33 is tilted, and causes a stopper 32 to be tilted clockwise. And, in synchronization with the tilting of the stopper operation lever 33, a reclining mechanism 12 is placed in a free state. When, in this state, a seat back 11 is tilted forwards, a stopper claw 11b provided on the seat back 11 pushes the stopper 32, and the stopper 32 abuts a stopper receiving portion 36 fixed to the seat back 11 side. As a result, the seat back 11 is prevented from being tilted further forwards beyond the forwardly tilted position due to the stopper 32. However, when the operation of the operation lever is canceled before the seat back 11 has attained the forwardly tilted state, the stopper operation lever 33 and the stopper 32 are restored to their former positions, with the result that the stopper 32 ceases to function. Thus, the seat back 11 is not stopped at the forwardly tilted state but is allowed to be tilted down to the greatly tilted state.

Thus, there is a need in the art for a vehicle seat with a satisfactory operability in which the seat back can be reliably placed in the forwardly tilted state or the greatly tilted state.

SUMMARY

The vehicle seat of the present invention includes a stopper stopping the forward tilting of the seat back at the forwardly tilted state, an operation lever, a stopper operation mechanism moving the stopper in synchronization with the operation of the operation lever, a reclining mechanism, a reclining lever for operating the reclining mechanism, and a connection lever interlocking the reclining lever and the stopper operation mechanism with each other. When the operation lever is operated, the seat back is placed in a free state via the stopper operation mechanism, the connection lever, and the reclining mechanism, and the stopper moves via the stopper operation mechanism. Between the stopper operation mechanism and the reclining lever is provided a retention mechanism that retains the stopper at a position to which it has moved.

Thus, by operating the operation lever, the stopper is retained in position. Thereby, even when the operation of the operation lever is canceled halfway through the tilting of the seat back from the rearwardly tilted state to the forwardly tilted state, the stopper is not restored to the former position, but is retained in position. For example, the stopper is moved to an acting position through operation of a forward tilting operation lever, and is retained in position at the acting position by the retention mechanism. As a result, the seat back can be reliably placed in the forwardly tilted state by the stopper. Alternatively, the stopper is moved to a non-acting position through operation of a great tilting operation lever, and is retained at the non-acting position by the retention mechanism. As a result, the seat back can be reliably placed in the greatly tilted state.

The connection lever of the present invention may be mounted so as to be movable with respect to the reclining lever. And, the retention mechanism may have a regulating structure which regulates the movement of the connection lever with respect to the reclining lever when the operation lever is operated. Due to this construction, the connection lever becomes incapable of moving with respect to the reclining lever after the operation of the operation lever, and is stucked between the reclining lever and the stopper operation mechanism. As a result, it is possible to retain the stopper in position via the stopper operation mechanism.

One end portion of the connection lever of the present invention may be mounted so as to be movable along an arcuate elongated hole formed in the reclining lever. And, the regulating structure of the retention mechanism may include a standby hole formed so as to be radially continuous with the elongated hole of the reclining lever, an urging member urging the connection lever so as to cause one end portion of the connection lever to move to the standby hole, and a pivoting regulating portion regulating the pivoting of the connection lever so as to retain the above-mentioned one end portion in the elongated hole. And, it is also possible to adopt a construction in which when the operation lever is operated, the pivoting regulating portion moves to a canceling position, and one end portion of the connection lever moves to the standby hole. Due to this construction, when one end portion of the connection lever moves to the standby hole, the connection lever becomes incapable of moving along the elongated hole. As a result, the movement of one end portion of the connection lever is regulated with respect to the reclining lever. As a result, the connection lever retains the stopper in position via the stopper operation mechanism.

BEST MODE FOR CARRYING OUT THE INVENTION

Figure 1:
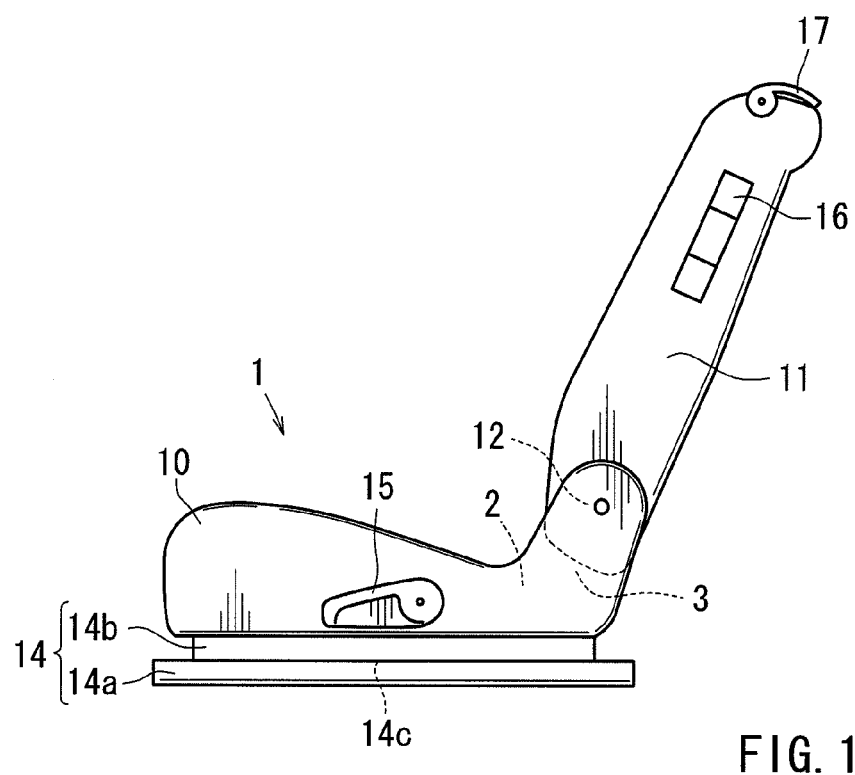
FIG. 1 is a side view of a vehicle seat with a seat back in a rearwardly tilted state.

An embodiment will be described with reference to FIGS. 1 to 8. As shown in FIG. 1, a vehicle seat 1 has a seat cushion 10 and a seat back 11. The seat cushion 10 is mounted to the floor surface of the vehicle interior via a rail 14 so as to be longitudinally slidable. The rail 14 includes an under rail portion 14a mounted to the floor surface side, an upper rail portion 14b mounted to the seat cushion 10 and longitudinally movable with respect to the under rail portion 14a, and a lock mechanism 14c releasably maintaining these rail portions in position.

Figure 2:
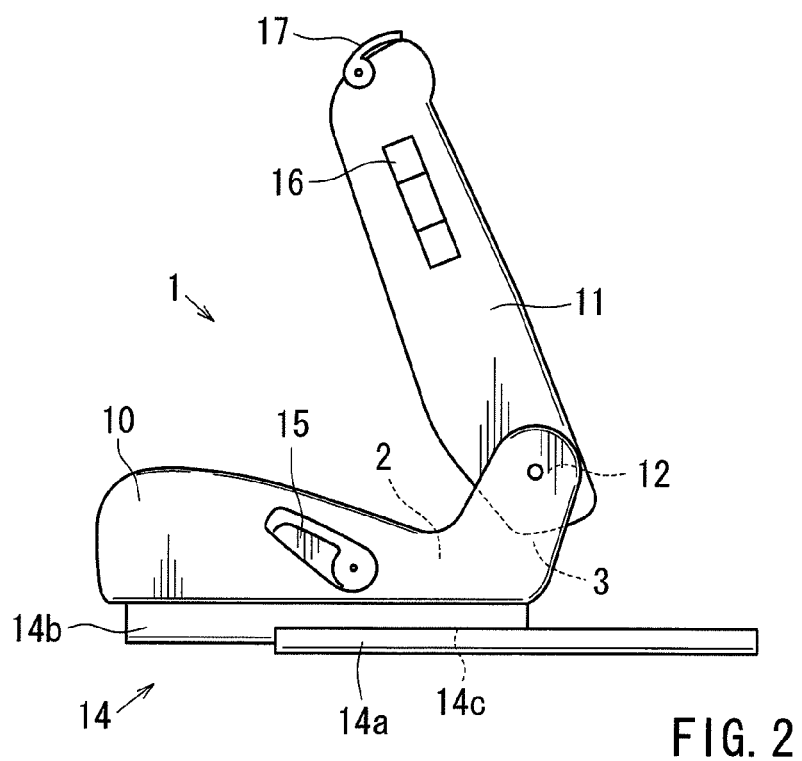
FIG. 2 is a side view of the vehicle seat with the seat back in a forwardly tilted state.
Figure 3:
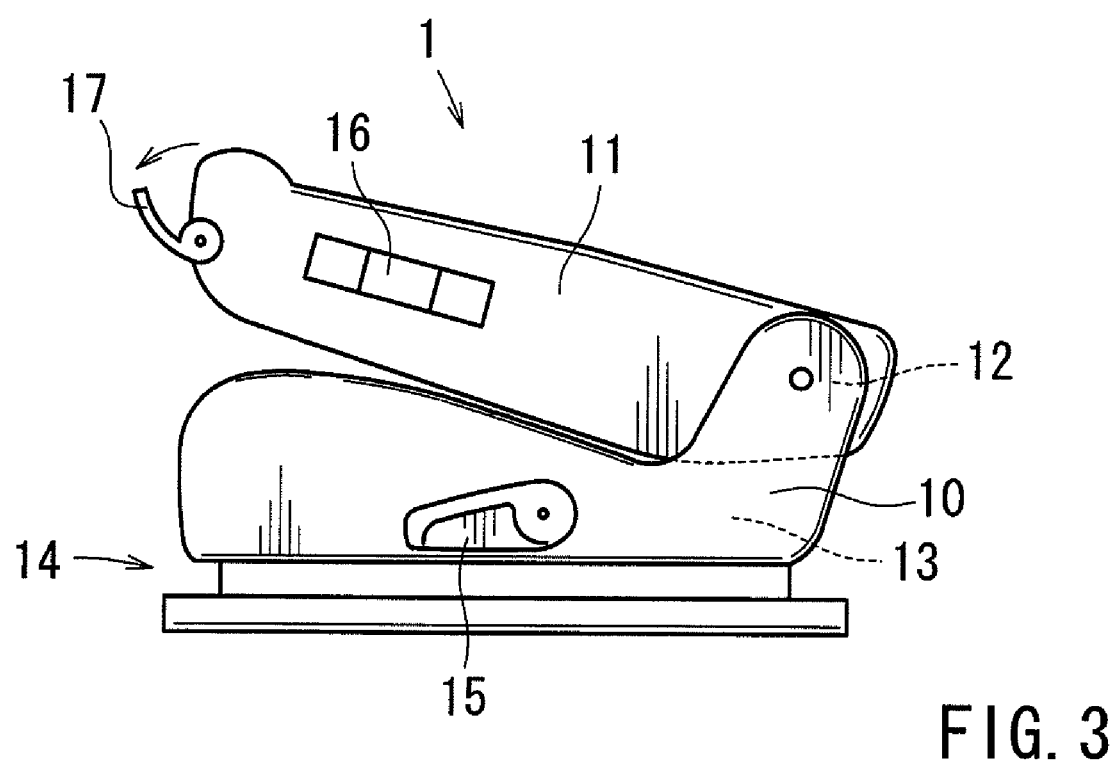
FIG. 3 is a side view of the vehicle seat with the seat back in a greatly tilted state.

The seat back 11 is pivotably mounted to the seat cushion 10 by a reclining mechanism 12, and is switched between a rearwardly tilted state shown in FIG. 1, a forwardly tilted state shown in FIG. 2, and a greatly tilted state shown in FIG. 3. On side surfaces of the seat cushion 10 and the seat back 11, there are provided forward tilting operation levers 15 and 16 that are operated when placing the seat back 11 in the forwardly tilted state. The forward tilting operation levers 15 and 16 are also used when performing angle adjustment when the seat back 11 is in the rearwadly tilted state. On top of the seat back 11, there is provided a great tilting operation lever 17 to be used when placing the seat back 11 in the greatly tilted state.

Figure 4:
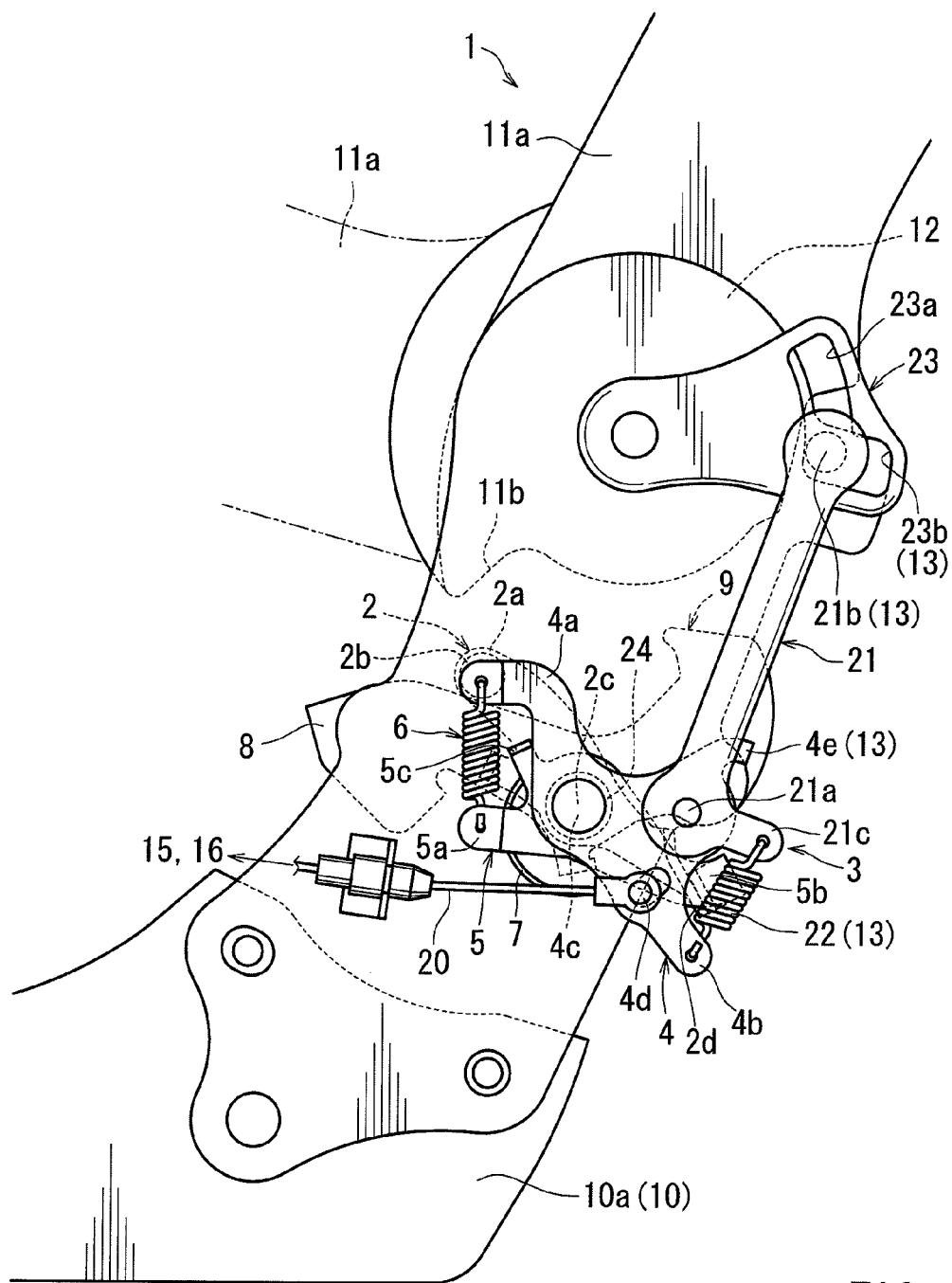
FIG. 4 is an enlarged side view of a portion of the vehicle seat in a vicinity of a stopper and a reclining device when the seat back is in the rearwardly tilted state.

As shown in FIG. 2, the seat cushion 10 is provided with a stopper 2 and a stopper operation mechanism 3. The stopper 2 is a member that stops the forward tilting of the seat back 11 at the forwardly tilted position shown in FIG. 2. As shown in FIG. 4, it has a pair of plate members 2a pivotably mounted to a frame 10a of the seat cushion 10. Between the forward end portions of the pair of plate members 2a, there is formed a stopper shaft 2b extending between and astride these forward end portions. At the rear end portion of the stopper 2, there is formed a force transmitting portion 2d receiving a force from the stopper operation mechanism 3. Between the stopper 2 and the frame 10a, an urging member 24 is mounted to urge the stopper 2 toward a non-acting position (counterclockwise).

The stopper operation mechanism 3 is a mechanism moving the stopper 2 in synchronization with the operation of the forward tilting operation levers 15 and 16. As shown in FIG. 4, the stopper operation mechanism 3 is mounted to the seat cushion 10 outside the stopper 2 relative to the frame 10a. The stopper operation mechanism 3 has a base 8 mounted to the frame 10a of the seat cushion 10, a main pivoting member 4 and a sub pivoting member 5 that are pivotably mounted to the base 8, and a connection spring 6 connecting them to each other.

As shown in FIG. 4, at the center of the main pivoting member 4, there is provided a shaft portion 4c pivotably mounted to the base 8. On a lower side portion of the main pivoting member 4, there is formed a lock portion 4d to which a cable 20 is locked. The cable 20 is pulled through operation of the forward tilting operation levers 15 and 16. Formed on an upper side portion of the main pivoting member 4 is a connection portion 4a to which one end portion of the connection spring 6 is connected.

As shown in FIG. 4, the other end portion of the connection spring 6 is connected to a connection portion 5a formed on a front side portion of the sub pivoting member 5. Thus, the sub pivoting member 5 is urged clockwise with respect to the main pivoting member 4 by the connection spring 6. On the other hand, on the front side portion of the sub pivoting member 5, a positioning portion 5c abuts the main pivoting member 4 and regulates the clockwise pivoting of the sub tilting member 5 with respect to the main pivoting member 4. When the forward tilting operation levers 15 and 16 are operated to pivot the main pivoting member 4 clockwise via the cable 20, the sub pivoting member 5 is pulled by the connection spring 6, and is pivoted clockwise together with the main pivoting member 4. And, the sub pivoting member 5 pushes the force transmitting portion 2d formed at the rear end portion of the stopper 2 by a force transmitting portion 5b formed at the rear end portion thereof.

Figure 5:
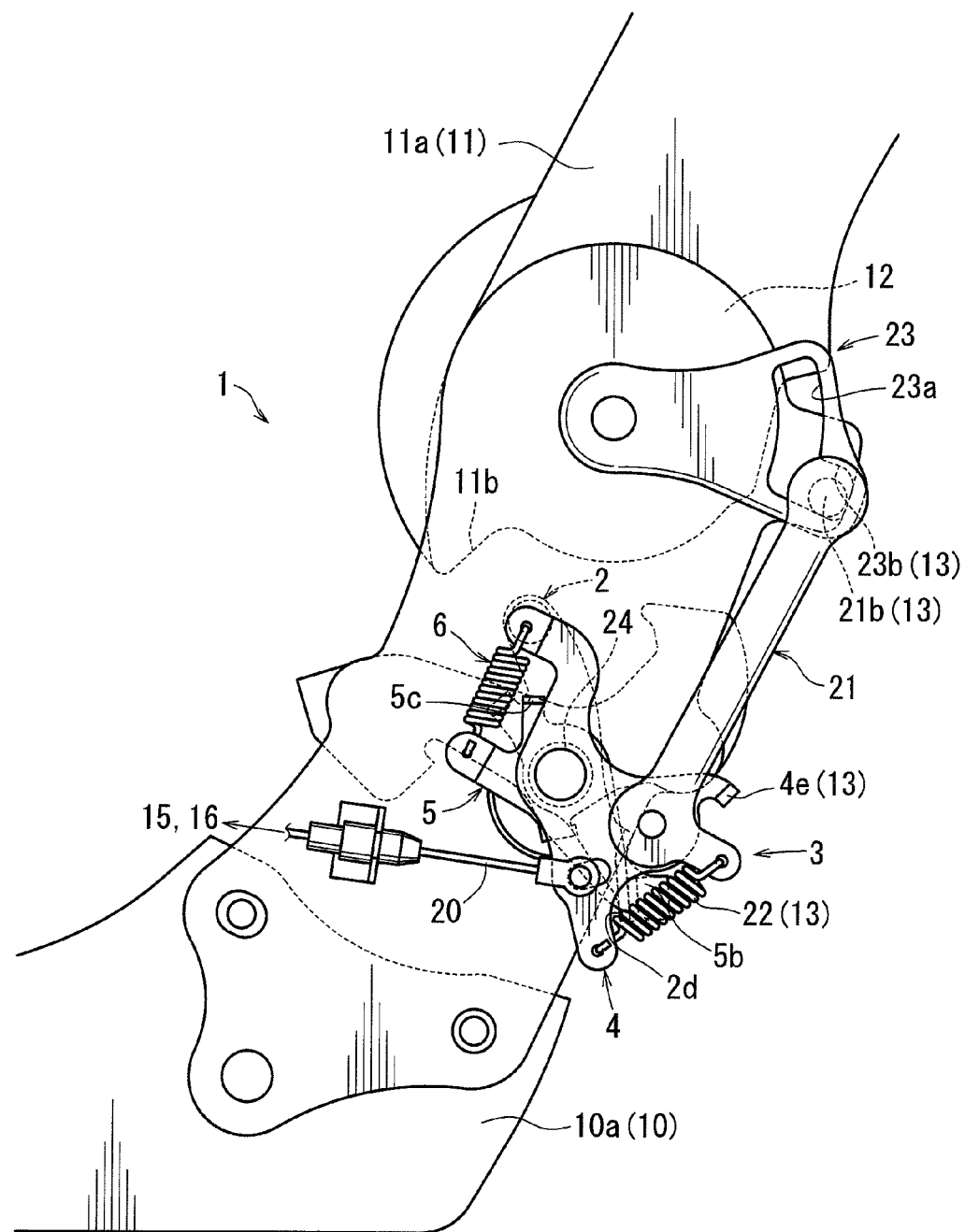
FIG. 5 is an enlarged side view of the portion of the vehicle seat in the vicinity of the stopper and the reclining device in a process in which the seat back is placed in the forwardly tilted state.
Figure 6:
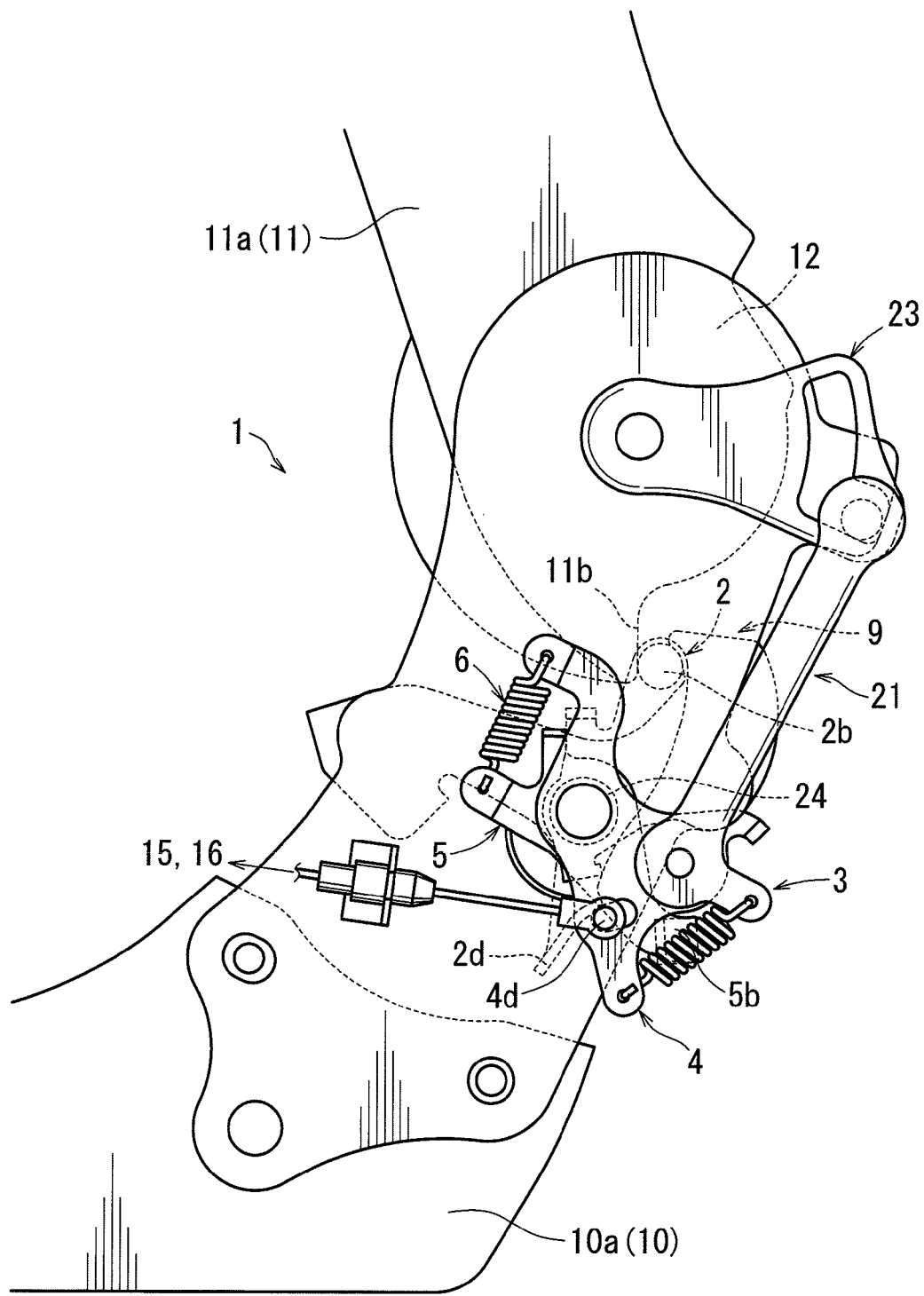
FIG. 6 is an enlarged side view of the portion of the vehicle seat in the vicinity of the stopper and the reclining device when the seat back is placed in the forwardly tilted state.

As a result, the stopper 2 is pivoted around a central portion 2c from the non-acting position shown in FIG. 4 to an acting position shown in FIG. 5. At the acting position, the stopper shaft 2b protrudes into the pivoting path of a stopper claw 11b formed in the seat back 11. Thus, when the seat back 11 is pivoted counterclockwise, the stopper claw 11b pushes the stopper shaft 2b, and the stopper 2 is pivoted, with the stopper shaft 2b abutting a stopper receiving portion 9 fixed to the seat back 11. As a result, the seat back 11 is regulated from pivoting by the stopper 2, and the seat back is placed in the forwardly tilted state shown in FIG. 2.

As shown in FIG. 4, a reclining mechanism 12 is provided between the seat cushion 10 and the seat back 11. The reclining mechanism 12 connects the seat back 11 and the seat cushion 10 to each other so as to allow switching between a free state, in which pivoting thereof is possible, and a lock state, in which pivoting thereof is impossible. The free state is attained by downwardly pivoting a reclining lever 23 formed at the center of the reclining mechanism 12. And, when the reclining lever 23 is pivoted upwards by the urging force of an urging member (not shown), the reclining mechanism 12 is placed in the lock state. The reclining mechanism 12 is also provided with a free zone which prevents it from being placed in the lock state when the seat back 11 is pivoted to a forward position beyond its use-range angle.

As shown in FIG. 4, the reclining lever 23 has an arcuate elongated hole 23a. One end portion 21b of a connection lever 21 is movably mounted to the elongated hole 23a, and the other end portion 21a of the connection lever 21 is pivotably connected to the main pivoting member 4. Thus, when the main pivoting member 4 is pivoted clockwise as shown in FIG. 5, the reclining lever 23 is pivoted downwards via the connection lever 21, and the reclining mechanism 12 is placed in the free state.

As shown in FIG. 4, between the main pivoting member 4 and the reclining lever 23, there is provided a retention mechanism 13 having a regulating structure regulating the movement of one end portion 21b of the connection lever 21 along the elongated hole 23a. The regulating structure has a standby hole 23b formed so as to be radially and outwardly continuous with the elongated hole 23a, an urging member 22 urging the connection lever 21, and a pivoting regulating portion 4e regulating the pivoting of the connection lever 21. The urging member 22 is stretched between a connection portion 21c formed at the lower end portion of the connection lever 21 and a rear side connection portion 4b formed at the rear end portion of the main pivoting member 4. By urging the connection lever 21, the urging member 22 urges one end portion 21b of the connection lever 21 toward the standby hole 23b.

As shown in FIG. 4, a pivoting regulating portion 4e is formed at the rear end portion of the main pivoting member 4, and protrudes beyond the rear end edge of the connection lever 21. Thus, due to the pivoting regulating portion 4e, the clockwise pivoting of the connection lever 21 is regulated, and one end portion 21b of the connection lever 21 is retained within the elongated hole 23a. When the main pivoting member 4 is pivoted clockwise, the pivoting regulating portion 4e moves to a canceling position, whereby one end portion 21b of the connection lever 21 moves to the standby hole 23b.

In the rearwardly tilted state shown in FIG. 1, the seat back 11 allows angle adjustment within a predetermined rearward tilting range. More specifically, by pulling the operating lever 15, the reclining mechanism 12 is placed in the free state, and, in this state, the seat back 11 is pivoted to a predetermined rearward tilting angle. In this state, the operation of the operation lever 15 is canceled, and the reclining mechanism 12 is placed in the lock state.

When the seat back 11 is to be placed in the forwardly tilted state shown in FIG. 2 from the rearwardly tilted state shown in FIG. 1, the forward tilting operation lever 15 or 16 is first operated. As a result, as shown in FIGS. 4 and 5, the stopper operation mechanism 3 is pivoted clockwise, and the stopper 2 is pivoted to the acting position. At the same time, the reclining lever 23 is pivoted clockwise via the connection lever 21, and the reclining mechanism 12 is placed in the free state. Subsequently, as shown in FIG. 5, the connection lever 21 is pivoted by the urging member 22, and one end portion 21b of the connection lever 21 moves to the standby hole 23b.

When, in this state, the seat back 11 is pivoted forwards, the free zone of the reclining mechanism 12 functions. When the free zone of the reclining mechanism 12 functions, the upward pivoting of the reclining lever 23 is regulated. Thus, the stopper 2 is retained in position via the connection lever 21 and the stopper operation mechanism 3. Thus, even when the operation of the forward tilting operation levers 15 and 16 is canceled, the stopper 2 continues to be retained at the acting position.

Figure 8:
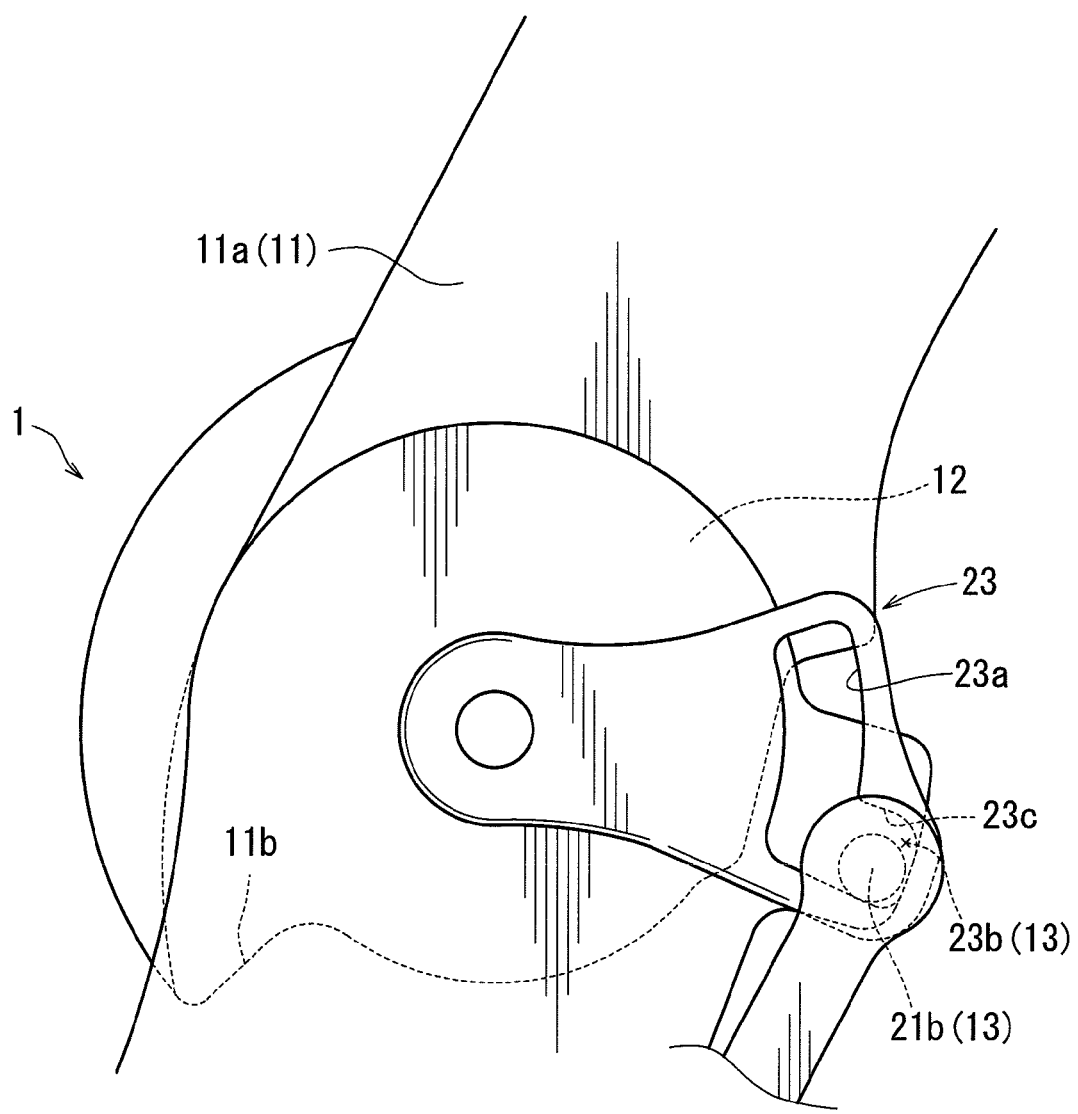
FIG. 8 is an enlarged side view illustrating in detail a retention mechanism when the seat back is in the forwardly tilted state.
Figure 9:
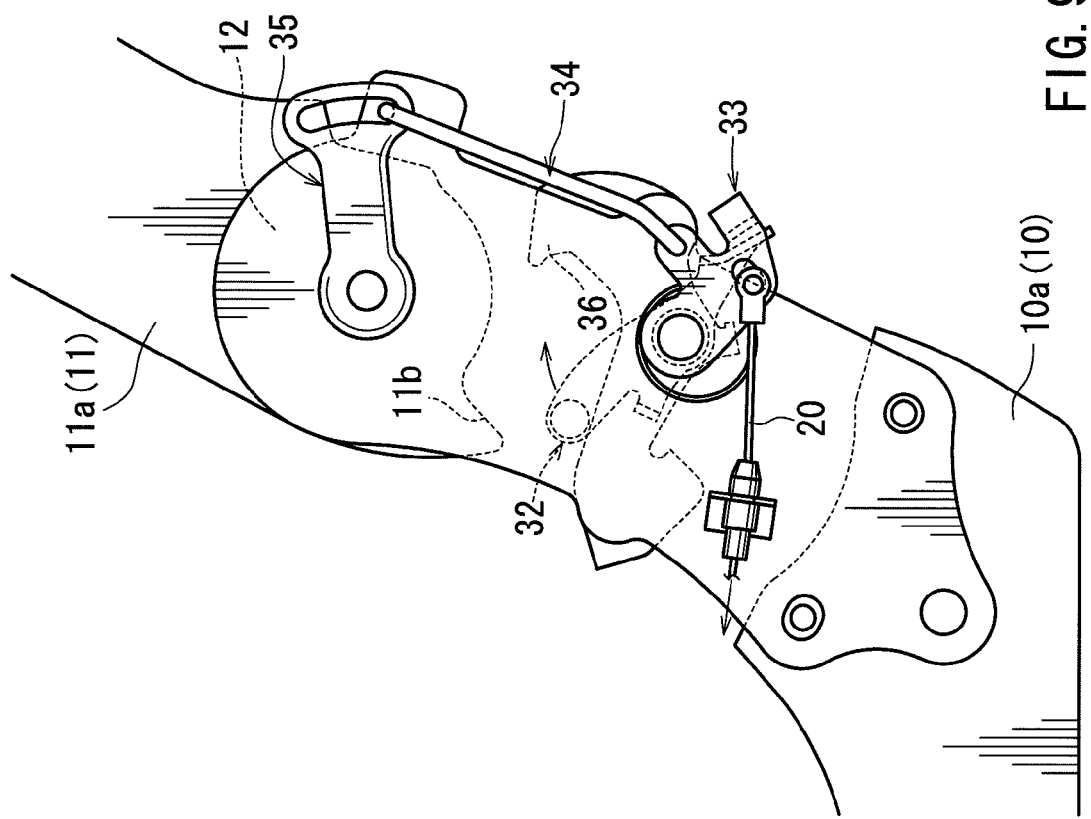
FIG. 9 is an enlarged side view of the portion of a conventional vehicle seat in the vicinity of a stopper and a reclining device.

That is, when the operation of the forward tilting operation lever 15 and 16 is canceled in the state in which the free zone of the reclining mechanism 12 functions to regulate the upward pivoting of the reclining lever 23 (the state shown in FIG. 5), the main pivoting member 4 tends to return to the position shown in FIG. 4. At this time, the connection lever 21 also tends to return to the position shown in FIG. 4. However, as shown in FIG. 8, the upward pivoting of the reclining lever 23 is regulated, so that an upper wall 23c of the standby hole 23b traverses the movement path of one end portion 21b of the connection lever 21, and one end portion 21b of the connection lever 21 abuts the upper wall 23c of the standby hole 23c. Thus, the movement of one end portion 21b of the connection lever 21 is regulated, whereby the return of the main pivoting member 4 and the connection lever 21 to the position shown in FIG. 4 is regulated. Thus, even when the operation of the forward tilting operation levers 15 and 16 is canceled, the stopper 2 continues to be retained at the acting position.

When the seat back 11 is pivoted further forwards from the state of FIG. 5, the stopper 2 is pushed by the stopper claw 11b provided on the seat back 11, and the stopper shaft 2b abuts the stopper receiving portion 9. As a result, the seat back 11 is prevented from being pivoted further forwards beyond the forwardly tilted state shown in FIG. 6 due to the stopper 2.

When the seat back 11 is to be placed in the greatly tilted state shown in FIG. 3 from the rearwardly tilted state shown in FIG. 1, the great tilting operation lever 17 is operated first. As a result, the reclining mechanism 12 is placed in the free state, and the seat back 11 is pivoted to the greatly tilted position, where it is laid down on the seat cushion 10. And, by placing the seat back 11 in the greatly tilted state, the reclining mechanism 12 is placed in the lock state. It is also possible to employ a mode in which, by operating the great tilting operation lever 17 or the forward tilting operation levers 15 and 16, the lock of the lock mechanism 14c of the rail 14 is canceled simultaneously. This makes it possible to cause the vehicle seat 1 to slide longitudinally in the forwardly tilted state shown in FIG. 2 or the greatly tilted state shown in FIG. 3.

Figure 7:
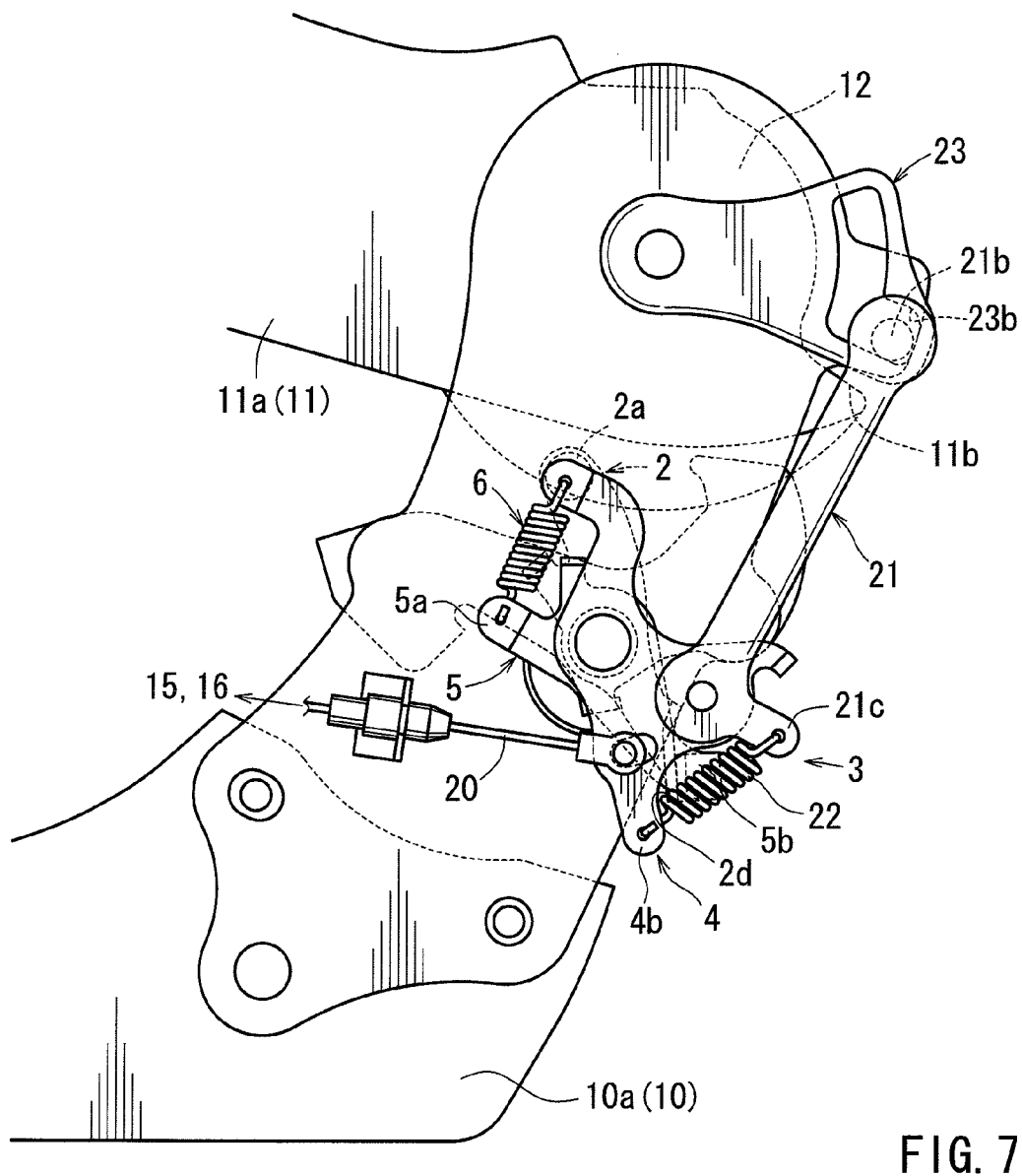
FIG. 7 is an enlarged side view of the portion of the vehicle seat in the vicinity of the stopper and the reclining device when the stopper is brought to an acting position while maintaining the seat back in the greatly tilted state.

When, as shown in FIG. 7, the forward tilting operation lever 15 or 16 is operated, with the seat back 11 being in the greatly tilted state, the stopper operation mechanism 3 is pivoted clockwise, and the stopper 2 moves from the non-acting position to the acting position. And, through the pivoting of the stopper operation mechanism 3, the reclining mechanism 12 is placed in the free state from the lock state via the connection lever 21 and the reclining lever 23. Due to the urging member 22, one end portion 21b of the connection lever 21 moves to the standby hole 23b, and the movement of one end portion 21b with respect to the reclining lever 23 is regulated.

When, in this state, the seat back 11 is raised, the free zone of the reclining mechanism 12 functions first. Subsequently, the stopper claw 11b is pivoted clockwise together with the seat back 11 (See FIG. 7), and the stopper claw 11b pushes the stopper shaft 2b. As a result, the stopper 2 is pivoted counterclockwise, and the force transmitting portion 2d of the stopper 2 abuts the force transmitting portion 5b of the sub pivoting member 5, with the stopper 2 pushing the sub pivoting member 5 counterclockwise.

At this time, as shown in FIG. 7, the main pivoting member 4 is retained at the position of FIG. 7 by the connection lever 21. Thus, the sub pivoting member 5 is pivoted counterclockwise while elastically expanding the connection spring 6. As a result, the stopper 2 moves to the non-acting position, and the seat back 11 is changed to the rearwardly tilted state of FIG. 1. Thus, it is also possible to change the seat back 11 from the greatly tilted state of FIG. 3 to the rearwardly tilted state of FIG. 1 through the operation of the forward tilting operation levers 15 and 16. The seat back 11 can also be changed from the greatly tilted state of FIG. 3 to the rearwardly tilted state of FIG. 1 by the primary operation, that is, through the operation of the great tilting operation lever 17.

This embodiment is formed as described above. That is, as shown in FIGS. 4 and 5, the retention mechanism 13 retaining the stopper 2 in position is provided between the stopper operation mechanism 3 and the reclining lever 23. Thus, by operating the operation levers 15 and 16, the stopper 2 is retained at the acting position. Thus, even when the operation of the operation levers 15 and 16 is canceled halfway through the pivoting of the seat back 11 from the rearwardly tilted state to the forwardly tilted state, the stopper 2 does not return to the former position but is retained in position. As a result, the seat back 11 can be reliably placed in the forwardly tilted state.

Further, as shown in FIG. 5, the retention mechanism 13 has a regulating structure (22, 23b, 4e) regulating the movement of the connection lever 21 with respect to the reclining lever 23 when the operation levers 15 and 16 are operated. Thus, after the operation of the operation levers 15 and 16, the connection lever 21 becomes incapable of moving with respect to the reclining lever 23, and is stuck between the reclining lever 23 and the stopper operation mechanism 3. As a result, it is possible to retain the stopper 2 at the acting position via the stopper operation mechanism 3.

The present invention is not restricted to the above configuration but allows adoption of the following configurations.

(1) In the above configuration, by operating the forward tilting operation levers 15 and 16, the stopper operation mechanism 3 is pivoted, and the stopper 2 moves to the acting position, with the retention mechanism 13 retaining the stopper 2 at the acting position. However, it is also possible to employ a configuration in which, by operating the great tilting operation lever 17, the stopper operation mechanism is pivoted, and the stopper moves from the acting position to the non-acting position, with the retention mechanism retaining the stopper at the non-acting position. This makes it possible to reliably place the seat back in the greatly tilted state.

(2) The retention mechanism 13 of the above configuration has the standby hole 23*b*, the urging member 22, and the pivoting regulating portion 4*e*. However, it is also possible, for example, to employ a configuration in which a projecting and retracting movement occurs with respect to the elongated hole 23*a* of the reclining lever 23 in synchronization with the operation of the operation levers, and in which, through this projecting and retracting movement, one end portion 21*b* of the connection lever 21 is switched between a state in which it is movable with respect to the elongated hole 23*a* and a state in which it is immovable with respect thereto.

(3) The standby hole 23*b* of the retention mechanism 13 of the above configuration is formed to extend radially outwards with respect to the elongated hole 23*a*. However, it is also possible for the standby hole to be formed so as to extend radially inwards from the elongated hole.

The invention claimed is:

1. A vehicle seat in which a seat back pivotably mounted to a seat cushion is switched between a rearwardly tilted state in which the seat back is rearwardly tilted, a forwardly tilted state in which the seat back is forwardly tilted, and a greatly tilted state in which the seat back is tilted further forwards beyond the forwardly tilted state, comprising:

a stopper that stops forward pivoting of the seat back at the position of the forwardly tilted state;

first and second operation levers operable to place the seat back in the forwardly tilted state and the greatly tilted state, respectively;

a stopper operation mechanism that moves the stopper in synchronization with the operation of the first operation lever;

a reclining mechanism switching the seat back between a free state in which the seat back can be pivoted with respect to the seat cushion and a locked state in which the seat back cannot be pivoted with respect the seat cushion;

a reclining lever that operates the reclining mechanism; and a connection lever interlocking the reclining lever and the stopper operation mechanism with each other, wherein, through operation of the first operation lever, in order to place the seat back in the forwardly tilted state, the stopper moves from a non-acting position to an acting position via the stopper operation mechanism, the non-acting position not stopping the forward pivoting of the seat back at the position of the forwardly tilted state, the acting position capable of stopping the forward pivoting of the seat back at the position of the forwardly tilted state, wherein, through the operation of the first operation lever, the seat back is placed in the free state via the stopper operation mechanism, the connection lever, and the reclining lever, and when the seat back is pivoted forwardly from the rearwardly tilted state, the reclining lever is held in a position that enables the seat back to be in the free state, and wherein a retention mechanism is provided between the stopper operation mechanism and the reclining lever, and when the first operation lever is operated and the reclining lever is held in the position that enables the seat back to be in the free state, the retention mechanism prevents the connection lever from moving in relation to the reclining lever, and the connection lever maintains the stopper at the acting position via the stopper operation mechanism.

2. The vehicle seat as in claim 1, wherein:

the connection lever is mounted so as to be movable with respect to the reclining lever, and the retention mechanism includes a regulating structure that regulates the movement of the connection lever with respect to the reclining lever when the operation lever is operated.

3. The vehicle seat as in claim 2, wherein:

one end portion of the connection lever is mounted so as to be movable along an arcuate elongated hole formed in the reclining lever, the regulating structure of the retention mechanism includes a standby hole formed so as to be radially continuous with the elongated hole of the reclining lever, an urging member urging the connection lever so as to cause the one end portion of the connection lever to move to the standby hole, and a pivoting regulating portion regulating the pivoting of the connection lever so as to retain the one end portion of the connection lever in the elongated hole, and when the operation lever is operated, the pivoting regulating portion moves to a canceling position, and the one end portion of the connection lever moves to the standby hole.

* * * * *

UNITED STATES PATENT AND TRADEMARK OFFICE
CERTIFICATE OF CORRECTION

PATENT NO. : 7,922,251 B2
APPLICATION NO. : 12/666443
DATED : April 12, 2011
INVENTOR(S) : H. Hayakawa et al.

Page 1 of 1

It is certified that error appears in the above-identified patent and that said Letters Patent is hereby corrected as shown below:

At column 7, line 42 (claim 1, line 18) of the printed patent, change "respect the" to --respect to the--.

Signed and Sealed this
Thirteenth Day of December, 2011

David J. Kappos
*Director of the United States Patent and Trademark Office*